Aug. 28, 1956 R. B. WOODBURY 2,761,133
DIRECT READING INDICATOR FOR A RADIO NAVIGATION SYSTEM
Filed June 18, 1946 3 Sheets-Sheet 1

INVENTOR
ROGER B. WOODBURY
BY
ATTORNEY

INVENTOR
ROGER B. WOODBURY

Aug. 28, 1956 R. B. WOODBURY 2,761,133
DIRECT READING INDICATOR FOR A RADIO NAVIGATION SYSTEM
Filed June 18, 1946 3 Sheets-Sheet 3

INVENTOR
ROGER B. WOODBURY

BY *M. O. Hayes*

ATTORNEY

2,761,133

DIRECT READING INDICATOR FOR A RADIO NAVIGATION SYSTEM

Roger B. Woodbury, Boston, Mass., assignor, by mesne assignments, to the United States of America as represented by the Secretary of the Navy Application June 18, 1946, Serial No. 677,484

10 Claims. (Cl. 343—103)

This invention relates to a position indicating system, and more particularly to apparatus for indicating and measuring the difference in arrival time of timed pulses from radio transmitting stations of known position.

A long range navigation system which enables a navigator to locate himself on the surface of the earth is disclosed and claimed in the Patent No. 2,689,346 issued September 14, 1954, to John A. Pierce et al., entitled "Long Range Navigation System." Broadly, this system comprises a plurality of pairs of pulse transmitters spaced at known positions, each transmitter radiating pulses which bear a fixed time relationship with pulses radiated by the other transmitter comprising the pair. The two stations are termed master and slave, the slave being synchronized to its master. The navigator has apparatus which receives these pulses and indicates the difference in the propagation times of pulses from paired transmitters. With this information, and knowledge of the fixed time relationship between paired pulses, a location may be established along spherical hyperbolas having their foci at respective pairs of transmitters. The intersection of these hyperbolas will fix the position of the navigator. In practice, charts of the area served by the transmitters are prepared for the navigator's use. These charts have plotted thereon the family of spherical hyperbolas corresponding to each pair of transmitters, the hyperbolas plotted being chosen to correspond to some predetermined time difference. Using these charts the navigator has only to measure the arrival time difference of the corresponding pulses from each pair of transmitters and then determine his position by interpolating the distance between the two hyperbolas nearest to the measured difference in arrival time.

As previously mentioned, the navigator has receiving apparatus for amplifying received pulses and indicating apparatus for measuring the difference in arrival time of paired pulses. Indicators in present use are unsatisfactory in several respects. A principal problem is that of training personnel for proper operation of the equipment. The procedure used in measuring the difference in arrival time of paired pulses is complicated, and casually trained personnel are incapable of taking accurate fixes. Maintenance is also a problem, since many of the circuits employed are extremely critical as to adjustment, voltage regulation, etc. Weight and power requirements of the present equipment are relatively large, and accordingly, many classes of aircraft are not now considered for installation.

It is, therefore, the object of the present invention to provide improved indicating apparatus for use in the described long range navigation system.

Another object is to provide indicating apparatus which is simple and quick to operate.

A further object is to provide indicating apparatus which has stable timing circuits.

Another object is to provide indicating apparatus which is light and small.

These and other objects will be more apparent upon consideration of the following specification, taken in connection with the accompanying drawings, forming a part thereof, in which.

As previously mentioned, transmitters comprising a pair are referred to as master and slave. Starting with the master and going to the slave signal, the time difference must always be greater than $P/2$ and less than $P$ where $P$ is the repetition period. Slow sweeps are triggered at one half the repetition frequency and display the full cycle, the first half cycle of the complete period appearing as an upper trace and the second half cycle appearing as a lower trace. Therefore, if the master pulse appears near the beginning of the upper trace, the slave pulse must appear somewhere on the lower trace. The final timing measurement is made by matching the signals on fast sweeps. The period of time during which the fast sweeps are generated is determined by the position of pedestals, upon which the received pulses are positioned when in the slow sweep position. The sweep on which the master pulse appears occurs near the start of the first half cycle, and is fixed in time. The sweep on which the slave pulse appears, however, is variable in time any place in the second half cycle.

Figure 1:
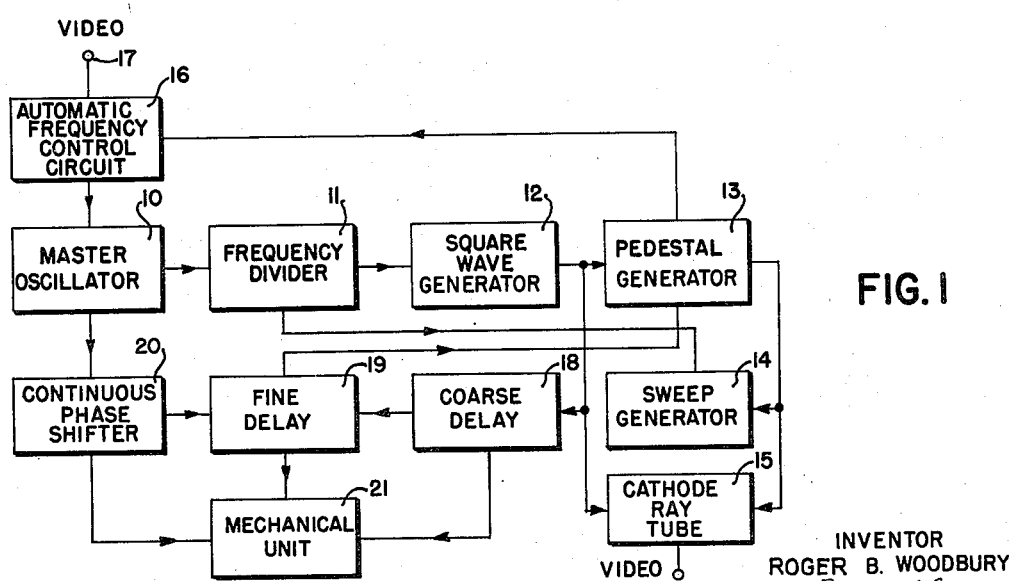
Fig. 1 is a simplified block diagram of the essential components of the indicating apparatus.

Referring to Fig. 1, master oscillator 10 provides the basic time reference for the indicator by supplying two output signals through a buffer amplifier. One output signal of this oscillator is applied to frequency divider 11, the output of which triggers square wave generator 12, thereby producing a symmetrical square wave at the repetition frequency. This square wave is used for trace separation on cathode ray tube 15 and for switching pedestal generator 13 and coarse delay 18. Pedestal generator 13 supplies the two pedestals for the sweeps and a trigger to automatic frequency control circuit 16, which latter circuit, by controlling the frequency of master oscillator 10, locks the time position of a video signal, applied at terminal 17, to the top pedestal. Sweep generator 14 provides both slow and fast sweeps. The trigger for the slow sweeps comes from the frequency divider, while in the case of the fast sweeps the output of pedestal generator 13 triggers the sweep generator. Coarse delay 18 operates in steps, the amount of delay being recorded on a counter in mechanical unit 21. Fine delay 19, started by a trigger from coarse delay 18, is terminated by a phase shifted mark from continuous phase shifter 20 energized by the second output signal from master oscillator 10. Mechanical unit 21, mechanically coupled to continuous phase shifter 20, fine delay 19 and coarse delay 18, adds the outputs of the coarse and fine delays, and thereby indicates the difference in arrival time of the master and slave pulse.

Figure 2:
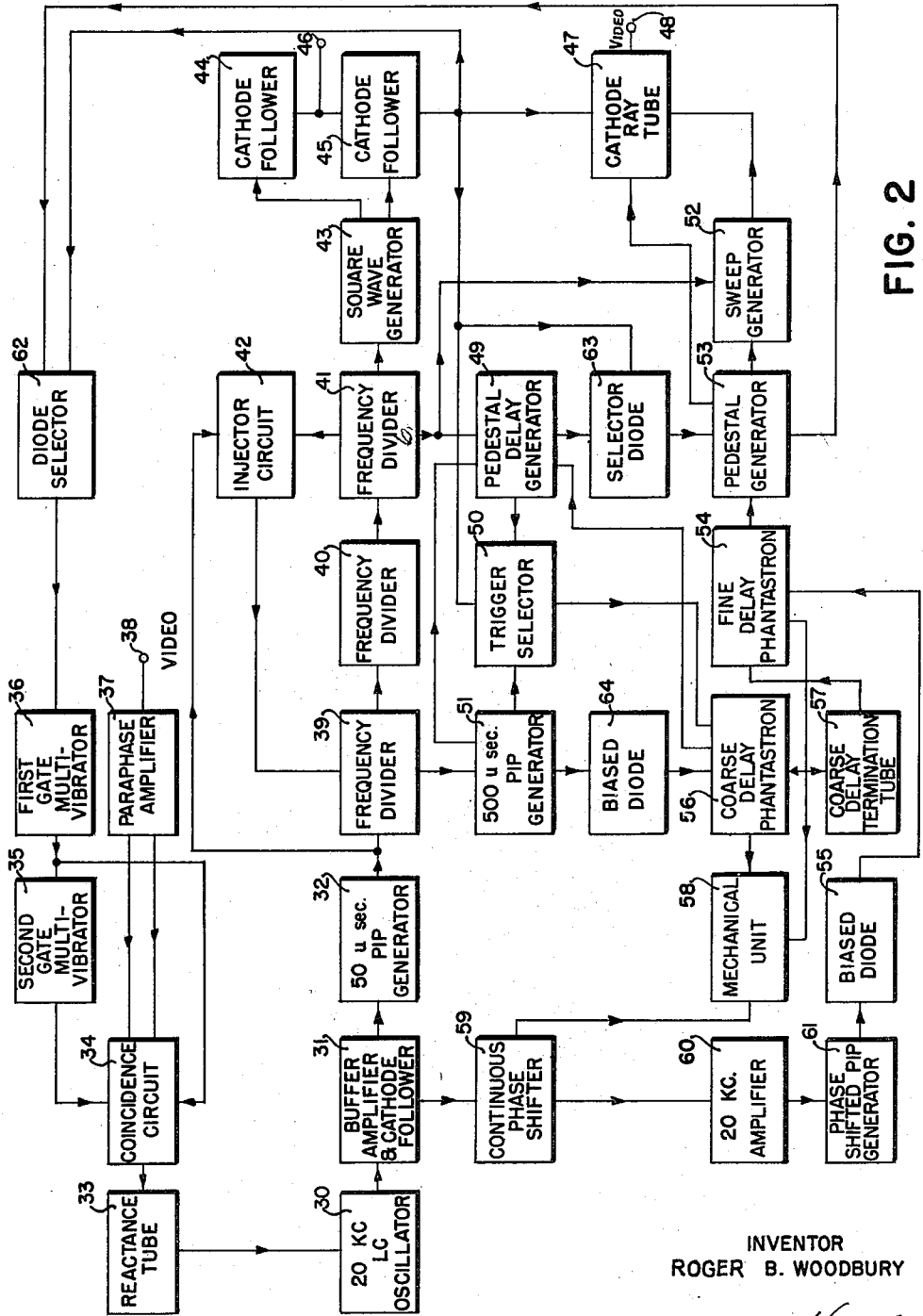
Fig. 2 is a block diagram of an embodiment of the improved indicating apparatus.

Fig. 2, which represents an embodiment of the improved indicating apparatus, is a more complete block diagram of the indicator generalized in Fig. 1. The basic time reference is 20 kc. oscillator 30, which employs a high Q coil in a conventional Hartley oscillator circuit, stabilized by putting a resistor and an RC network in the oscillator cathode circuit, the resistor performing the function of plate stabilization and the RC network serving as an amplitude control. The sinusoidal output of oscillator 30 is applied to a combination buffer amplifier and cathode follower 31, which prevents loading of the oscillator.

The frequency of master oscillator 30 is controlled by reactance tube 33 which obtains a control signal from the output of a discriminator circuit which consists of the time coincidence circuit 34, the first gate multivibrator 36, and the second gate multivibrator 35. The first gate multivibrator is triggered from the upper sweep pedestal of pedestal generator 53 through a diode selector 62 which, in turn, is biased to nonconduction from square wave generator 43 during the second half cycle of the pulse repetition frequency to prevent triggering from the lower sweep. In the present embodiment the pedestals are applied to first gate multivibrator 36 through diode selector 62, which is gated by the square wave from square wave generator 43, as taken from the output of cathode follower 45, so that it appears as an open circuit to the lower pedestal. First gate multivibrator 36 gives an output gate of about 100 microseconds' duration, and at its termination triggers second gate multivibrator 35 which produces a similar gate. Coincidence circuit 34 may have, for example, two tubes which are turned on consecutively in time by applying the positive output of first gate multivibrator 36 to the grid of the first of said coincidence tubes and the positive output of second gate multivibrator 35 to the grid of the second tube. Video signals applied at terminal 38, after passing through paraphase amplifier 37 to obtain a signal wave form of inverted polarity, are fed to the plate of the first coincidence tube in positive polarity and to the cathode of the second coincidence tube in negative polarity. The circuit operates to produce an increasing voltage output if the video pulse coincides longer in time with the first gate, a decreasing voltage output if the video pulse coincides longer in time with the second gate, and a constant voltage output for equal coincidence times.

Reactance tube 33 is so connected across the resonant circuit of oscillator 30 that it controls the frequency of the oscillator. The D.-C. voltage output of the above-mentioned coincidence circuit 34 is applied to the grid of the reactance tube, and thereby changes the resonant frequency of the tank circuit across which said reactance tube is shunted. Accordingly, if more of the video coincides in time with the first gate than with the second and the voltage on the grid of the reactance tube becomes more positive, the frequency of oscillator 30 will increase slightly and the signal on the cathode ray tube will move to the right. If, however, more of the video coincides with the second gate the voltage on the grid of reactance tube 33 becomes more negative, the frequency of oscillator 30 will decrease, and the signal will move to the left. Thus the signal will be locked symmetrically in the two gates.

The frequency controlled output of oscillator 30, as previously mentioned, is applied to combination buffer amplifier and cathode follower 31. One of the outputs of this circuit is fed into 50 microsecond pip generator 32, for example in the present embodiment a blocking oscillator, which generates triggers at the base rate of oscillator 30. The output of pip generator 32 is fed into the counter circuit, which, as used herein, divides the base frequency of oscillator 30 by either 300—N, 400—N, or 500—N, where N is the station number, depending on the operating repetition rate. The counter circuit consists of three frequency divider stages 39, 40 and 41, their count being 10, 5, and 6, 8 or 10 respectively. The first stage 39 produces 500 microsecond markers, the second stage 40 produces 2500 microsecond markers, and the third stage 41 produces repetition rate trigger pulses of 66⅔, 50 or 40 cycles per second, depending on the rate desired. The timing sequence representative of the outputs of frequency dividers 39, 40 and 41 is shown at A, B and C respectively of Fig. 3. It is to be noted that the markers are represented herein as positive, though the negative output of these frequency dividers may be actually used for application to succeeding stages.

In the present embodiment, it is advantageous to use frequency dividers of the well known energy storage type having a gas tube which is held in a deionized state by applying a positive bias voltage to its cathode and to which 50 microsecond negative triggers from pip generator 32 are applied to the cathode of the gas tube through a capacitive voltage divider, one element of which connects the cathode to ground. Accordingly, a negative step appears at the cathode, and subsequent negative triggers repeat this process, the cathode approaching ground potential until the firing potential of the gas tube is reached. At this time the tube fires and the cycle is repeated. The capacitive voltage divider associated with frequency divider 39 is adjusted so that 10 incoming triggers are required to fire the gas tube. Output pulses for succeeding frequency divider 40 are obtained from the plate of the gas tube of frequency divider 39, frequency divider 40 being different in that the capacitive voltage divider associated with it is adjusted so that 5 output pulses from frequency divider 39 are required to fire its gas tube. Frequency divider 41 is likewise similar except that either of three capacitive voltage dividers may be switched into its input circuit, the dividers being adjusted so that it takes either 6, 8, or 10 input triggers to fire the gas tube. Thus, frequency divider 41 produces triggers of 66⅔, 50, or 40 cycles per second, depending on the rate desired. The divider circuit as used herein has the advantage that within reasonable limits the count is independent of the frequency of the incoming triggers. The upper limit of frequency is determined by two factors: first, the deionization time of the tube, and second, the time it takes the plate of the gas tube to recover to B+ voltage through its dropping resistor. The lower limit of frequency is determined by the heater to cathode leakage of the gas tube used. The circuit is also particularly independent of voltage fluctuations, an accurate count being maintained over relatively wide variations in B+ voltage and heater voltage.

As previously mentioned, a complete navigation system comprises a plurality of pairs of pulse transmitters, eight pairs, numbered from zero to seven, being the usual maximum. Different pairs are pulsed at different repetition rates to allow for identification. For example, if the basic repetition rate for a given system is 25 cycles per second, station pair 0 operates at 25 cycles per second, station pair 1 at 25 1/16 cycles per second, station pair 2 at 25 2/16 cycles per second, etc. These various repetition rates are obtained by removing 50×N microseconds, where N is any integer from 0 to 7 inclusive and corresponds to the station number, from each half cycle, or, stated differently, removing 2×50×N microseconds from the period of the 25 cycle repetition frequency. Similarly, 2×50×N microseconds would be removed from the period of the 20 or 33⅓ cycle repetition frequencies. Because of circuit considerations the removal of 50×N microseconds is accomplished at the beginning of each half cycle.

Injector circuit 42, which is an integral part of the divider chain, is used to obtain these variations in repetition rate. This circuit is responsive to the output of frequency divider 41 and to 50 microsecond marker pulses from pip generator 32 to produce an output pulse during time coincidence of the respective input pulses. The resulting output pulse from the injector circuit is coupled to the cathode of frequency divider 39. The action of this injector pulse through its coupling on the counter is the same charge sharing arrangement as found in the input of a counter tube. The voltage division is made such that sufficient charge is deposited on the condenser connecting the cathode of frequency divider 39 to ground equivalent of the number of input steps corresponding to the station pair number. For example, considering station pair three, sufficient charge is deposited on the condenser connecting the cathode of the gas tube of frequency divider 39 to ground by the firing of the gas tube of injector circuit 42 to lower the cathode of frequency divider 39 by an amount equivalent to the voltage deposited by three 50 microsecond markers. Accordingly, it takes only seven 50 microsecond markers to fire the divider circuit, and the period of the first marker from frequency divider 39 is 350 microseconds, rather than 500. All subsequent markers from frequency divider 39 occurring in the half cycle under discussion will have a full period of 500 microseconds. The injector circuit does not again operate until frequency divider 41 produces another output marker, at a time marking the start of the next half cycle. At this time the injector circuit again operates so as to remove 150 microseconds from the period of the first output marker of frequency divider 39 occurring in the half cycle. Accordingly, by being able to switch in any one of seven coupling condensers to connect the output of injector circuit 42 to frequency divider 39 we are able to vary the charge sharing so as to subtract $50 \times N$ microseconds, N being any integer from zero to seven, from each half cycle. All of the markers shown at A of Fig. 3 are uniformly spaced except those marked 80 and 81, where the time interval is $50 \times N$ microseconds less than the time spacing of the rest of the series.

Figure 3:
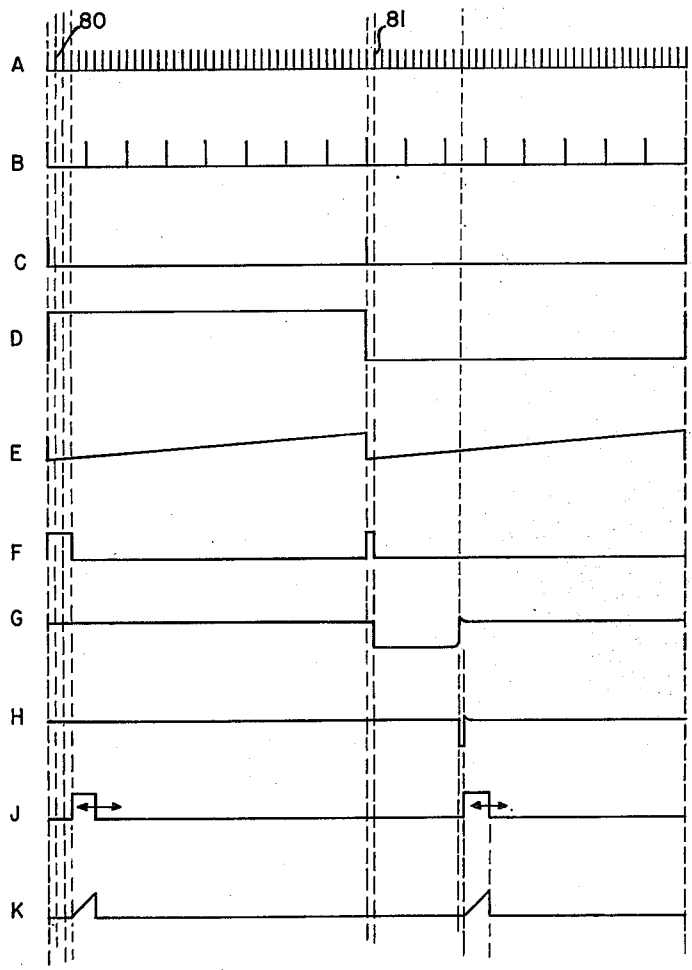
Fig. 3 is a representation of the timing sequence and voltage waveforms at pertinent points in the circuit of Fig. 2.

The output of frequency divider 41 is used to trigger square wave generator 43, which generates a square wave at the repetition frequency, this waveform being shown at D of Fig. 3. A scale of two circuit of the Eccles-Jordan type may be herein embodied, or any similar flip-flop circuit. It should be noted that square wave generator 43 acts as a frequency divider, dividing the output of frequency divider 41 by two. Cathode followers 44 and 45 obtain their input signals from square wave generator 43. These cathode followers provide the correct amplitude of square wave for trace separation on cathode ray tube 47, for the trigger selector circuit 50, for the automatic frequency control circuit, for pedestal generator 53 and for receiver amplitude balance. A high resistance potentiometer may be connected between cathode followers 44 and 45 provide at terminal 46 a square wave of variable amplitude and reversible phase for adjusting the gain of the receiver during successive half cycles. By so varying the receiver gain the master and slave pulses can be made of equal amplitude for more accurate matching on cathode ray tube 47.

Pedestal delay generator 49 performs two functions: first, it delays the start of the upper trace pedestal until after three 500 microsecond marks, and second, it generates a gate to feed to trigger selector 50 which in turn selects the first 500 microsecond mark on the lower trace to trigger the coarse delay. Pedestal delay generator 49 is a conventional delay multivibrator which receives its initial trigger from the output of the last counter stage, frequency divider 41. On the first half cycle corresponding to the upper trace, a negative trigger from this counter, applied to the multivibrator, turns off the normally conducting stage and starts multivibrator action. This normally conducting stage is held off for a time substantially determined by the time constant of the resistive and capacitive elements in the multivibrator circuit. The value of this time constant is such that when the 500 microsecond markers from 500 microsecond pip generator 51 (similar in operation to 50 microsecond pip generator 32) are applied to bias the normally non-conducting but now conducting stage, and therein amplified and then applied to bias the normally conducting stage, this stage is biased sufficiently to return to the conducting region with the occurrence of the third marker. Either of two amplitudes of 500 microsecond markers are employed in this process because, as the stations are selected, these markers move in 50 microsecond steps. Accordingly, to keep the top pedestal three 500 microsecond markers from the sweep beginning, different amplitudes of markers are taken from a divider network. The lagging edge of the gate so produced triggers pedestal generator 53, thereby supplying the pedestal for the upper trace.

The above described action is only true in the case of the first half cycle. In the second half cycle pedestal delay generator 49 is again initiated from the output of frequency divider 41, but is terminated at the first 500 microsecond mark by the negative cathode waveform of coarse delay phantastron circuit 56, which it triggers. The function of trigger selector 50 is to generate a trigger only at the correct time to initiate coarse delay phantastron 56. Trigger selector 50 operates as a coincidence circuit to which three pulse signals are applied simultaneously. Markers from 500 microsecond pip generator 51, for example, may be applied to the cathode, the gate from pedestal delay generator 49 may be applied to the control grid, and the output of square wave generator 43 may be applied to the suppressor grid of a multigrid electron tube. The square wave on the suppressor grid prevents conduction during the first half cycle, corresponding to the upper trace. During the second half cycle it permits tube conduction providing coincidence exists. An output signal from the plate is obtained when a coincidence between the gate from pedestal delay generator 49 and a marker from 500 microsecond pip generator 51 occurs, this signal output being used to trigger coarse delay phantastron 56. The output gate from this coarse delay is applied to the normally non-conducting stage of pedestal delay generator 49, terminating its action, and thereby preventing further coincidence. The output waveform of pedestal delay generator 49 is represented at F of Fig. 3.

Pedestal generator 53 performs the following functions: first, it generates three different lengths of pedestals for the upper and lower traces; second, it provides intensifying gates for cathode ray tube 47 for the fast sweeps; and third, it triggers first gate multivibrator 36 in the automatic frequency control circuit. The functional operation of pedestal generator 53 is the same as that of a conventional delay multivibrator. On the upper trace it is triggered by the falling edge of the gate from pedestal delay generator 49, applied through selector diode 63. To prevent similar triggering on the lower trace, the output of square wave generator 43 is applied to bias selector diode 63, making an effective open circuit of this diode. Triggering on the lower trace is by the output pulse of fine delay phantastron 54. The pedestals are shown at J of Fig. 3, their width being either 220, 700, or 2100 microseconds in the present embodiment.

The sweep generator 52 supplies all the sweep functions necessary in one unit. It requires two different input trigger pulses. One for the slow sweeps and one for the fast sweeps. The trigger pulses for the slow sweeps are obtained from the output of the last stage of the frequency divider 41. The triggers for the fast sweeps are provided by the delayed pedestals from pedestal generator 53 which are used to mark the position of the received radio frequency pulses. The sweeps are applied to the horizontal plates of the cathode ray tube 47. For slow sweeps the recovery is accomplished during a negative voltage pulse from frequency divider 41, this pulse biasing the sweep generator to nonconduction. The slow sweep wave form is shown at E of Fig. 3. Switching of the sweep circuit is accomplished in a different manner during the fast sweeps, the circuit being pulsed from generator 53 so that it is biased to conduction. The rate of rise of the sweep is changed by switching the time constants of the circuit. The fast sweep wave form is represented at K of Fig. 3.

It is the function of continuous phase shifter 59 to produce a sinewave which is continuously phaseable. A push-pull alternating current voltage from buffer amplifier and cathode follower 31 is fed into an RC network of the correct magnitude such that the resultant output consists of three alternating current voltages which are 120° out of phase with each other and of equal amplitude. These three voltages are fed to the input terminals of a variable phase shifting condenser, the phase of the output depending on the angular position of the rotor with respect to the three input terminals. The 20 kc. sinewave from continuous phase shifter 59 is amplified in 20 kc. amplifier 60, and then applied to phase shifted pip generator 61, which is similar in its operation to 50 microsecond pip generator 32.

The coarse delay circuit is biased to conduction by the output of square wave generator 43 at the pulse repetition frequency of the radio frequency pulses. The plate voltage of the phantastron tube continues to rise until its plate voltage equals the sum of the coarse step delay potentiometer voltage and the amplitude of the input pulses from pip generator 51. The first pulse from pip generator 51 after the occurrence of this equality results in terminating the output wave form of the coarse delay circuit and provides a step delayed trigger pulse. For example, a suitable phantastron circuit may provide for conditions in which a negative trigger from trigger selector 50, as previously described, is applied to the plate of tube 56. Phantastron action starts and the plate potential starts to drop at a constant rate. Pips from 500 microsecond pip generator 51 are also fed to the plate of tube 56 through biased diode 64. The plate of diode 64 is so connected to coarse delay control which provides a variable voltage source, herein termed the "range voltage," that the plate of phantastron tube 56 must drop to a potential in excess of the "range voltage" by the amplitude of the 500 microsecond pips before these pips appear at the phantastron plate. The first pip to so appear is coupled to the grid by the condenser connecting the plate and grid of the phantastron tube. Thereupon the pip appears at the cathode and is coupled from there to the grid of the coarse delay termination tube 57. Here the pip is amplified, and it is then fed back to the suppressor grid of tube 56, where it causes termination of the phantastron action. This action supports the generation of a large pip at the cathode of phantastron tube 56, resulting in a large output from termination tube 57. The output of coarse delay termination tube 57 triggers fine delay phantastron 54. This insures that the fine delay is not triggered unless the coarse delay is terminated. In this manner, coarse delay phantastron 56 selects any one of forty 500 microsecond pips on which to terminate. The pip selected is registered on mechanical unit 58. The step delay waveform from delay phantastron 56 is represented at G of Fig. 3.

The delay circuit as herein described avoids potentiometer loading and also avoids non-linearities due to the plate operating at very low potentials. There is also a material improvement in minimum range as it is not necessary to allow the phantastron cycle to terminate before selecting a pip. The drift and effects of voltage fluctuations of the circuit are identical to those of a similar phantastron.

Fine delay phantastron 54 is similar in operation to coarse delay phantastron 56 except that it has a maximum delay of 550 microseconds rather than 20,000 microseconds, and is terminated directly by a phase shifted 20 kc. mark applied through biased diode 55, rather than by a termination circuit similar to coarse delay termination tube 57. The fine delay control is an eleven turn potentiometer, which gives a delay of 50 microseconds per turn, which is the same as the phase shifter. With proper calibration, then, fine delay phantastron 54 always terminates on the same phase shifted pip. Thus, the overall accuracy of the complete delay system is determined only by the accuracy of the phase shifted 20 kc. pip. The output of fine delay phantastron 54 is represented at H of Fig. 3.

To summarize the wave form schedule of Fig. 3 with respect to Fig. 1: line A represents a division by 10 of pulses generated from the 20 kc. sine wave to yield range markers at 500 microsecond intervals except for the first mark after the start of each half period of a repetition rate, this time being equal to $500-n50$ microseconds in each case, that is a division by $10-n$. Line B represents a further division by 5 in divider 11 to give an output for every fifth marker pulse represented in line A. Line C represents a further division in frequency divider 11 by 6, 8 or 10, as selected. Line D represents the result of applying pulses from C to square wave generator 12 to produce an output square wave having a recurrence frequency equal to the Loran repetition frequency. Line E represents the upper slow sweep triggered from D. Line F represents a fixed delay of $1500-n \times 50$ microseconds from the multivibrator 49 triggered by pulses at D and whose time constant renders the circuit responsive to third pulses from A to return to normal for the first half cycle; for the second half cycle triggered from pulses from D but terminated by a pulse from trigger selector 50 responsive to triple coincidence of pulses from A, D and F to initiate the coarse phantastron delay circuit 18. Line G indicates the coarse phantastron delay output wave form initiated by coincidence of pulse 81 from A and the output wave from F and terminated by step adjustment to select a marker pulse from A. Line H represents the output of fine phantastron delay circuit 19 initiated by the termination of coarse phantastron delay circuit from G and terminated by a selected pulse from the pip generator responsive to the phase shifted sine wave form 20. Line J represents the adjustable pedestals from circuit 13 triggered by the termination of fixed delay F on the first half cycle and by termination of fine delay phantastron 19 on the second half cycle and prevented from triggering from F by selector diode 63. Line K represents the fast sweeps generated by circuit 14 in response to output pulses from pedestal generator 53.

Figure 4:
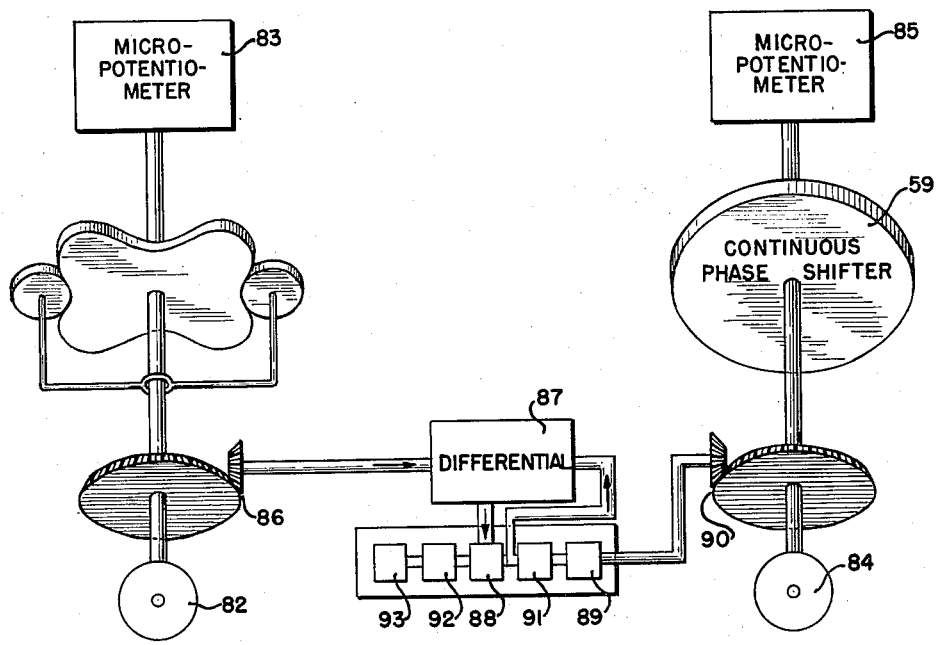
Fig. 4 is a simplified diagram of the mechanical unit.

Mechanical unit 58, as represented in Fig. 4, makes a mechanical connection between the coarse delay, fine delay, and phase shifting network. A first handwheel 82, the coarse delay control, controls the position of step delay potentiometer 83 which sets up the "range voltage" of coarse delay phantastron 56. A second handwheel 84, the fine delay control, performs a similar function for continuous fine delay potentiometer 85 of fine delay phantastron 54 and is coupled to continuous phase shifter 59. The coarse delay control turns in quarter turn steps, one revolution being 2000 microseconds. The fine delay control is a continuous control, one revolution being equivalent to 50 microseconds. Through bevel gears 86 with a one to two and a half step down the input from the coarse delay control reaches the output shaft of differential 87. Through the differential there is a two to one step up, which in turn is geared to the number three (hundreds) wheel 88 of a counter with a two and one half to one step up. The second input gear of the differential is prevented from turning by ordinary counter construction. The input from the fine delay control reaches the first (units) wheel 89 of the counter through a five to one step up in bevel gears 90. Transfer from wheel one 89 to wheel two 91 (tens) is normal. From wheel two 91 to wheel three 88 the transfer is accomplished through the one to one action of the differential by having a transfer pinion drive the second input gear, which also drives the hundreds wheel 88 of the counter after going through the differential. The counter then gives the total delay reading by adding the outputs of the coarse and fine delay phantastrons, 56 and 54 respectively, on the hundreds wheel. Wheels 92 and 93 are the thousands and tens of thousands wheels respectively.

Although the invention has been disclosed in a particular embodiment, it will be obvious to one skilled in the art that many changes may be made without departing from the spirit of the invention, as sought to be defined in the following claims.

What is claimed is:

1. Apparatus for measuring the time difference between radio frequency pulses of each of two synchronized recurrent series of pulse emissions comprising, a master oscillator, means for controlling the frequency of said master oscillator with respect to the recurrence rate of said two series of pulse emissions, a frequency divider connected to the output of said master oscillator, a square wave generator synchronized to the output of said frequency divider, means for generating a delay which is variable in steps, means for generating a delay which is continuously variable, said continuous delay being started at the end of said step delay, a pedestal generator, means for firing said pedestal generator at a fixed time and again at a time determined by the output of said continuous delay, whereby said step and variable delays are adjusted so that the relative time position of pedestals produced is made to correspond to the relative time positions of said two radio frequency pulses, and counter means, whereby the time spacing of said pedestals is recorded for direct reading.

2. Apparatus for measuring the time difference between radio frequency pulses of each of two synchronized recurrent series of pulse emissions comprising, a master oscillator, an automatic frequency control circuit for controlling the frequency of said master oscillator with respect to the recurrence rate of said two series of pulse emissions, said frequency control circuit including means for generating two gates which are consecutive in time, a coincidence circuit to which said gates and said radio frequency pulses are applied, whereby a voltage is produced which is a function of the time position of a pulse with respect to said consecutive gates, and a reactance tube to which said voltage is applied, said reactance tube being shunted across said master oscillator so as to control its frequency, a frequency divider connected to the output of said master oscillator, means for changing the output of said frequency divider in small increments, a square wave generator synchronized by the output of said frequency divider, a delay circuit connected to said frequency divider and fired each half cycle, a coarse delay phantastron fired by said delay circuit the second half of each cycle, means for terminating the action of said coarse delay phantastron with a synchronizing trigger from said frequency divider, a fine delay phantastron fired by said coarse delay phantastron, a continuous phase shifter connected to the output of said master oscillator, means for terminating said fine delay phantastron by a trigger from said continuous phase shifter, a pedestal generator, said pedestal generator being fired the first half cycle by said delay circuit and the second half cycle by said fine delay phantastron, whereby said coarse delay phantastron and said fine delay phantastron are adjusted so that the relative time position of pedestals produced is made to correspond to the relative time position of said two radio frequency pulses, a cathode ray tube, a sweep generator for producing a horizontal beam deflection, said sweep generator being fired by said frequency divider for slow sweep operation and by said pedestal generator for fast sweep operation, and a mechanical unit, said mechanical unit including coupling means to said coarse delay phantastron, coupling means to said fine delay phantastron, coupling means to said continuous phase shifter, and a mechanical counter, whereby the delays of said coarse delay phantastron and said fine delay phantastron are added and registered on said counter.

3. Apparatus for measuring the time difference between radio frequency pulses of each of two synchronized recurrent series of pulse emissions comprising, a master timing oscillator, means responsive to the output of said oscillator for producing a series of pulses bearing a predetermined subharmonic relation to said oscillator frequency, a first multivibrator responsive to said pulses to produce a first selector pulse, a second multivibrator responsive to said first selector pulse to produce a second selector pulse, a coincidence circuit responsive to said radio frequency pulses and said first and second selector pulses to produce a voltage as a function of the relative times of occurrence of said radio frequency pulses and said first and second selector pulses, and a reactance tube to which said voltage is applied, said reactance tube being shunted across said master oscillator to control its frequency with respect to the recurrence rate of said two series of pulse emissions.

4. Apparatus for measuring the time difference between radio frequency pulses of each of two synchronized recurrent series of pulse emissions comprising, a master timing oscillator, means responsive to the output of said oscillator for producing a series of accurately timed pulses, a frequency divider responsive to said timing pulses for producing a series of pulses bearing a predetermined subharmonic relation to said oscillator frequency, a first multivibrator responsive to the output pulses of said frequency divider to produce a first selector square wave output pulse, a second multivibrator responsive to said first selector pulse to produce a second selector square wave output pulse, a coincidence circuit responsive to said radio frequency pulses and said first and second selector pulses to produce a voltage output having an amplitude related to the relative times of occurrence of said radio frequency pulses and said first and second selector pulses, and a reactance tube to which said voltage is applied, said reactance tube being shunted across said master oscillator to control its frequency with respect to the recurrence rate of said two series of pulse emissions.

5. Apparatus for measuring the time difference between radio frequency pulses of each of two synchronized recurrent series of pulse emissions comprising, a timing master oscillator having a sine wave output, a pulse generator responsive to said oscillator output for producing a series of pulses fixed in time position with reference to said oscillator output, a second pulse generator responsive to said oscillator output for producing a second series of pulses displaced an adjustable amount with reference to said first series of pulses, a first delay circuit producing an output wave form adjustable in steps to be terminated in response to a selected pulse of said first series of pulses, a second delay circuit producing an output wave form continuously adjustable to be terminated in response to a selected pulse from said second series of pulses, means for generating a first reference pulse which is in fixed time relation to said oscillator output, means for generating a second reference pulse from the termination of said second delay circuit wave form, whereby said step delay adjustment and said variable delay adjustment are variable so that the relative time position of said first and second reference pulses is made to correspond to the relative time positions of said two radio frequency pulses.

6. Apparatus for measuring the time difference between radio frequency pulses of each of two synchronized recurrent series of pulse emissions comprising, a timing master oscillator having a sine wave output, a pulse generator responsive to said oscillator output for producing a series of pulses fixed in time position with reference to said oscillator output, a second pulse generator responsive to said oscillator output for producing a second series of pulses displaced an adjustable amount with reference to said first series of pulses, a first delay circuit producing an output wave form adjustable in steps to be terminated in response to a selected pulse of said first series of pulses, a second delay circuit producing an output wave form continuously adjustable to be terminated in response to a selected pulse from said second series of pulses, means for generating a first reference pulse which is in fixed time relation to said oscillator output, means for generating a second reference pulse from the termination of said second delay circuit wave form, a mechanical counter, and means mechanically coupling the adjustment of said second pulse generator, the adjustment of said first delay circuit and the adjustment of said second delay circuit to said counter, whereby said counter indicates directly the total delay adjustment required so that the relative time position of said first and second reference pulses corresponds to the relative time position of said two radio frequency pulses and the time spacing is directly indicated on said counter.

7. Apparatus for measuring the time difference between radio frequency pulses of each of two synchronized recurrent series of pulse emissions comprising, a master timing oscillator having a sine wave output means for controlling the frequency of said master oscillator with respect to the recurrence rate of said two series of pulse emissions, a pulse generator responsive to the sine wave output of said oscillator for producing a first series of accurately timed pulses, a frequency divider responsive to the output of said pulse generator for producing a second series of pulses at the recurrence rate of said pulse emissions, a square wave generator responsive to said second series of pulses, a coarse step delay circuit responsive to the output of said square wave generator at said recurrence rate responsive to said square wave to initiate a square wave output and having an adjustable delay time to select one of said accurate timing pulses to terminate its operation, a second delay circuit responsive to the termination of operation of said step delay circuit, a continuously adjustable phase shifter energized from the output of said master oscillator, a second pulse generator responsive to said phase shifted sine wave for producing a second series of accurately timed pulses, said second delay circuit being further responsive to said second series of accurately timed pulses and having a continuously adjustable delay time to select one of said second series of accurately timed pulses to terminate its operation, means for generating a first reference pulse which is in fixed time relation to said oscillator output, means for generating a second reference pulse from the termination of operation of said second delay circuit, whereby said step delay circuit adjustment and said continuously variable delay circuit adjustment can be varied so that a relative time position of said first and second reference pulses is made to correspond to the relative time positions of said two radio frequency pulses.

8. Apparatus for measuring the time difference between radio frequency pulses of each of two synchronized recurrent series of pulse emissions comprising, a master timing oscillator having a sine wave output means for controlling the frequency of said master oscillator with respect to the recurrence rate of said two series of pulse emissions, a pulse generator responsive to the sine wave output of said oscillator for producing a first series of accurately timed pulses, a frequency divider responsive to the output of said pulse generator for producing a second series of pulses at the recurrence rate of said pulse emissions, a square wave generator responsive to said second series of pulses, a coarse step delay circuit responsive to the output of said square wave generator at said recurrence rate responsive to said square wave to initiate a square wave output and having an adjustable delay time to select one of said accurate timing pulses to terminate its operation, a second delay circuit responsive to the termination of operation of said step delay circuit, a continuously adjustable phase shifter energized from the output of said master oscillator, a second pulse generator responsive to said phase shifted sine wave for producing a second series of accurately timed pulses, said second delay circuit being further responsive to said second series of accurately timed pulses and having a continuously adjustable delay time to select one of said second series of accurately timed pulses to terminate its operation, means for generating a first reference pulse which is in fixed time relation to said oscillator output, means for generating a second reference pulse from the termination of operation of said second delay circuit, a mechanical counter, and means mechanically coupling the adjustment of said second pulse generator, the adjustment of said first delay circuit and the adjustment of said second delay circuit to said counter, whereby said counter indicates directly the total delay adjustment required so that the relative time position of said first and second reference pulses corresponds to the relative time position of said two radio frequency pulses and the time spacing is directly indicated on said counter.

9. Apparatus for measuring the time difference between the occurrence of two successive recurring events comprising, means for generating a series of accurately timed regularly recurrent pulses, means for generating a second series of accurately timed pulses at the same repetition frequency as said first series of pulses, means for continuously adjusting the time displacement of said second series of pulses with respect to said first series of pulses, a coarse delay circuit triggered in accordance with the occurrence of the first of said events and adjustable in steps to select one of said first series of pulses, and a continuously adjustable delay circuit triggered by said selected pulse from said first series of pulses and variable to select one of said second series of time displaced pulses in accordance with the occurrence of the second of said events, whereby said step delay adjustment, said continuous delay adjustment and said time displacement adjustment are combined to indicate said time difference.

10. Apparatus for measuring the time difference between the occurrence of two successive recurring events comprising, means for generating a series of accurately timed regularly recurrent pulses, means for generating a second series of accurately timed pulses at the same repetition frequency as said first series of pulses, means for continuously adjusting the time displacement of said second series of pulses with respect to said first series of pulses, a coarse delay circuit triggered in accordance with the occurrence of the first of said events and adjustable in steps to select one of said first series of pulses, and a continuously adjustable delay circuit triggered by said selected pulse from said first series of pulses and variable to select one of said second series of time displaced pulses in accordance with the occurrence of the second of said events, whereby said step delay adjustment, said continuous delay adjustment and said time displacement adjustment are combined to indicate said time difference, a mechanical counter, a differential gearing, and means for mechanically coupling said step delay adjustment, said continuously variable delay adjustment and said time displacement adjustment to said counter through said gearing, whereby said counter reads directly the time difference measurement.

References Cited in the file of this patent

UNITED STATES PATENTS

| | | |
|---|---|---|
| 2,226,459 | Bingley | Dec. 24, 1940 |
| 2,403,600 | Holmes et al. | July 9, 1946 |
| 2,403,626 | Wolff et al. | July 9, 1946 |
| 2,414,477 | Meacham | Jan. 21, 1947 |
| 2,420,516 | Bischoff | May 13, 1947 |
| 2,487,822 | McLamore et al. | Nov. 15, 1949 |
| 2,497,513 | Paine et al. | Feb. 14, 1950 |
| 2,515,464 | Minneman | July 18, 1950 |
| 2,621,238 | Palmer | Dec. 9, 1952 |
| 2,689,346 | Pierce et al. | Sept. 14, 1954 |

FOREIGN PATENTS

| | | |
|---|---|---|
| 644,579 | Great Britain | Oct. 11, 1950 |